US008312801B2

(12) United States Patent
Sundquist, III et al.

(10) Patent No.: US 8,312,801 B2
(45) Date of Patent: Nov. 20, 2012

(54) METHODS AND APPARATUS TO ADJUST THE LATERAL CLEARANCE BETWEEN CUTTING BLADES OF SHEARING MACHINES

(75) Inventors: Ronald Lee Sundquist, III, Moundridge, KS (US); Anwar Gulrez Kahn, Moundridge, KS (US)

(73) Assignee: The Bardbury Company, Moundridge, KS (US)

( * ) Notice: Subject to any disclaimer, the term of this patent is extended or adjusted under 35 U.S.C. 154(b) by 835 days.

(21) Appl. No.: 12/333,040

(22) Filed: Dec. 11, 2008

(65) Prior Publication Data

US 2009/0165626 A1 Jul. 2, 2009

Related U.S. Application Data

(60) Provisional application No. 61/017,435, filed on Dec. 28, 2007.

(51) Int. Cl.
*B26D 7/26* (2006.01)

(52) U.S. Cl. ............................................ 83/694; 83/640

(58) Field of Classification Search ................... 83/694, 83/640, 641, 636
See application file for complete search history.

(56) References Cited

U.S. PATENT DOCUMENTS

| | | | | |
|---|---|---|---|---|
| 2,339,641 | A * | 1/1944 | Jensen | 83/626 |
| 2,539,602 | A * | 1/1951 | Wehr | 83/694 |
| 3,218,902 | A * | 11/1965 | Berns et al. | 83/582 |
| 3,398,621 | A * | 8/1968 | Sack | 83/454 |
| 3,413,882 | A * | 12/1968 | James et al. | 83/641 |
| 3,756,110 | A * | 9/1973 | Von Arx | 83/522.23 |
| 4,050,338 | A | 9/1977 | Pearson | |
| 4,463,642 | A | 8/1984 | Minato et al. | |
| 4,507,997 | A | 4/1985 | Ikeda | |
| 4,625,605 | A | 12/1986 | Buta | |
| 4,630,944 | A | 12/1986 | Moehr | |
| 4,674,378 | A | 6/1987 | Kawano et al. | |
| 4,887,502 | A | 12/1989 | Voges | |
| 4,922,778 | A | 5/1990 | Nagai | |
| 4,924,740 | A | 5/1990 | Wright | |
| 4,998,829 | A | 3/1991 | Greer | |
| 5,042,345 | A | 8/1991 | Hawkins et al. | |
| 5,241,889 | A * | 9/1993 | Noe et al. | 83/641 |
| 5,402,699 | A | 4/1995 | Bittner | |
| 6,631,664 | B2 | 10/2003 | Muller | |
| 7,080,943 | B2 | 7/2006 | Hisanobu et al. | |
| 2005/0016344 | A1 | 1/2005 | Kozera | |

* cited by examiner

*Primary Examiner* — Stephen Choi
(74) *Attorney, Agent, or Firm* — Hanley, Flight & Zimmerman, LLC

(57) ABSTRACT

Apparatus and methods to adjust the lateral clearance between upper and lower blades of shearing machines are described. An example apparatus includes a first blade opposite a second blade and movably coupled to a frame of the shear press via a ram, wherein the first and second blades are to receive a strip material. A lateral clearance adjustor slidably coupled to the ram shifts the first blade laterally relative to the second blade. A sensor determines a clearance position and a first drive member moves the lateral clearance adjustor from an initial position to the clearance position. A second drive member operatively coupled to the ram drives the first blade toward the second blade to shear the strip material.

15 Claims, 10 Drawing Sheets

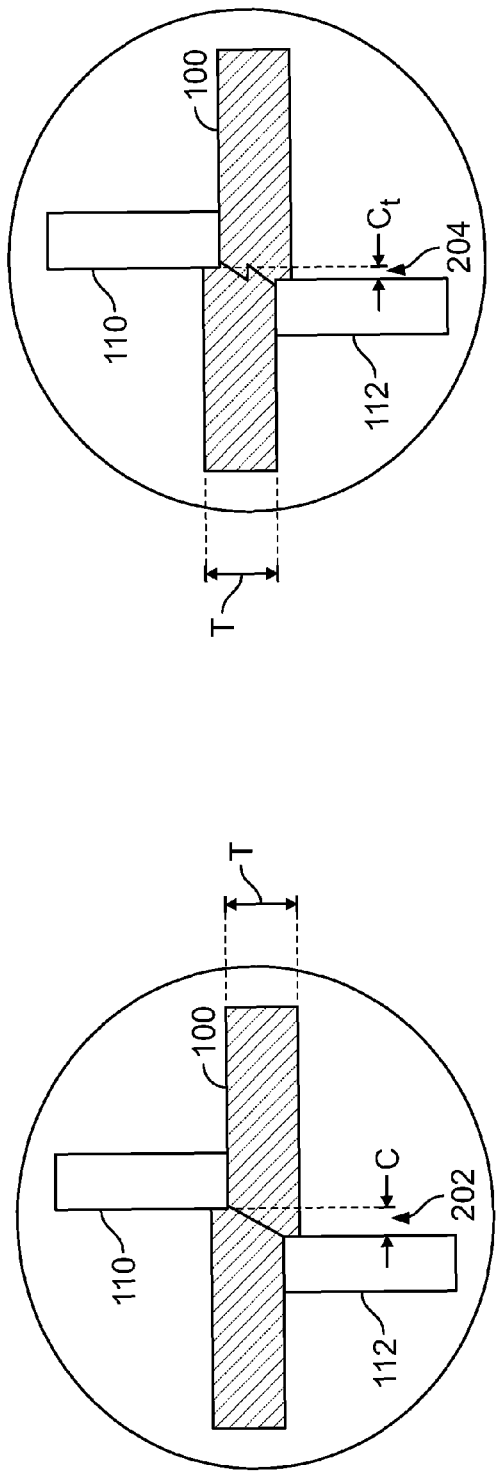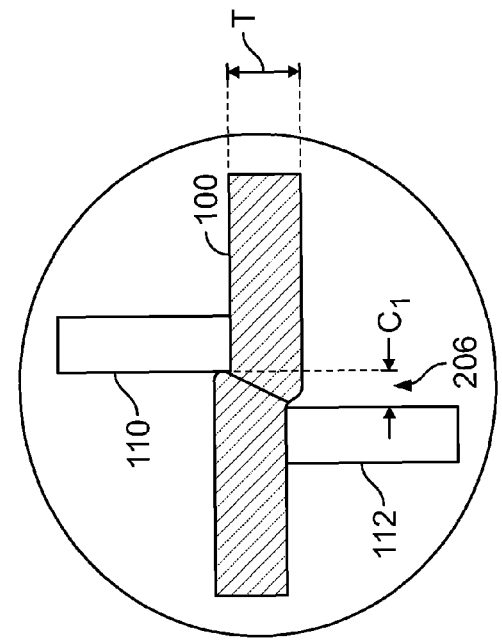

METHODS AND APPARATUS TO ADJUST THE LATERAL CLEARANCE BETWEEN CUTTING BLADES OF SHEARING MACHINES

CROSS REFERENCE TO RELATED APPLICATION

This patent claims the benefit of U.S. Provisional Patent Application Ser. No. 61/017,435, entitled "Methods and Apparatus to Adjust the Lateral Clearance between Cutting Blades of Shearing Machines," filed on Dec. 28, 2007, which is incorporated herein by reference in its entirety.

FIELD OF THE DISCLOSURE

The present disclosure relates generally to material shearing machines, and more particularly, to apparatus and methods to adjust the lateral clearance between cutting blades of shearing machines.

BACKGROUND

Material shearing machines have long been used to process strip material in mass production or manufacturing systems. Shearing machines can be used in a cut-to-length production line to shear a strip material prior to an operation such as, for example, roll forming a strip material to produce a finished product. Shearing machines that can efficiently and accurately shear or cut a strip material within a specific tolerance can substantially minimize the need for secondary operations (e.g., reshearing and/or deburring the strip material, etc.) to produce a conforming product, thereby reducing labor and scrap costs, improving cut quality, and improving down-line secondary processing.

Some shearing machines include a movable upper blade and a fixed lower blade that cooperate to shear or cut a strip material. However, the accuracy and quality of the cut can be affected by a lateral clearance or offset distance (e.g., a horizontal distance or distance along the direction of travel of the strip material relative to the blades) between the upper blade and the lower blade when the blades contact the material being cut. A proper lateral clearance or offset distance between the upper and lower blades produces a square, smooth cut leading to improved accuracy and quality of an end product. Additionally, a proper lateral clearance between the upper and lower blades requires less force to shear or cut the material, thereby resulting in longer blade life.

A proper lateral clearance between the upper and lower blades depends on the thickness of the strip material that the shear press is to process. Thus, to produce a smooth, quality cut, shearing machines that process strip materials having various thicknesses require a lateral clearance (e.g., a horizontal or offset distance between the upper and lower blades) adjustment for each of the different strip material thicknesses. Some known shearing machines provide manual lateral clearance adjustment mechanisms (e.g., a slide and screw configuration) to adjust the lateral clearance between the upper and lower blades. The lateral clearance is typically adjusted prior to a production run by an operator who, for example, utilizes a look-up table or chart to determine the proper lateral clearance required to cut a strip material having a particular thickness.

In some instances, however, the strip material (e.g., strip material from a roll of material) can have different thicknesses along its length, for example, when processing the strip material using a hand fed press, when changing between a first roll of strip material and a second roll of strip material, when production runs have a variety of strip materials with different thicknesses to be sheared in small quantities, etc. Thus, the thickness of the strip material can vary between each section of strip material to be cut. Shearing machines that utilize a manual lateral clearance adjustor require an operator to constantly measure the thickness of the strip material to properly adjust the lateral clearance, which can be time consuming and limit the production of the manufacturing process. Therefore, for optimum part production, a strip material that varies in thickness requires a lateral clearance adjustment between the upper and the lower blades for each length of strip material to be cut by the shearing press.

Other known shearing machines provide semi-automated lateral clearance adjustment mechanisms to eliminate the need to manually adjust the lateral clearance for each length of material to be sheared or cut. However, these known shearing machines provide adjustment mechanisms that require an initial set up to properly position measuring devices and/or mechanisms that measure or determine the thickness of the strip material to properly set the lateral clearance. This initial set up can be prone to inaccuracies and operator error, leading to improper lateral clearance adjustments.

BRIEF DESCRIPTION OF THE DRAWINGS

FIG. 2A is an illustration of a proper lateral clearance between upper and lower blades of a shear press.

FIG. 2B is an illustration of an improper lateral clearance between upper and lower blades of a shear press.

FIG. 2C is an illustration of another improper lateral clearance between upper and lower blades of a shear press.

DETAILED DESCRIPTION

Figure 1:
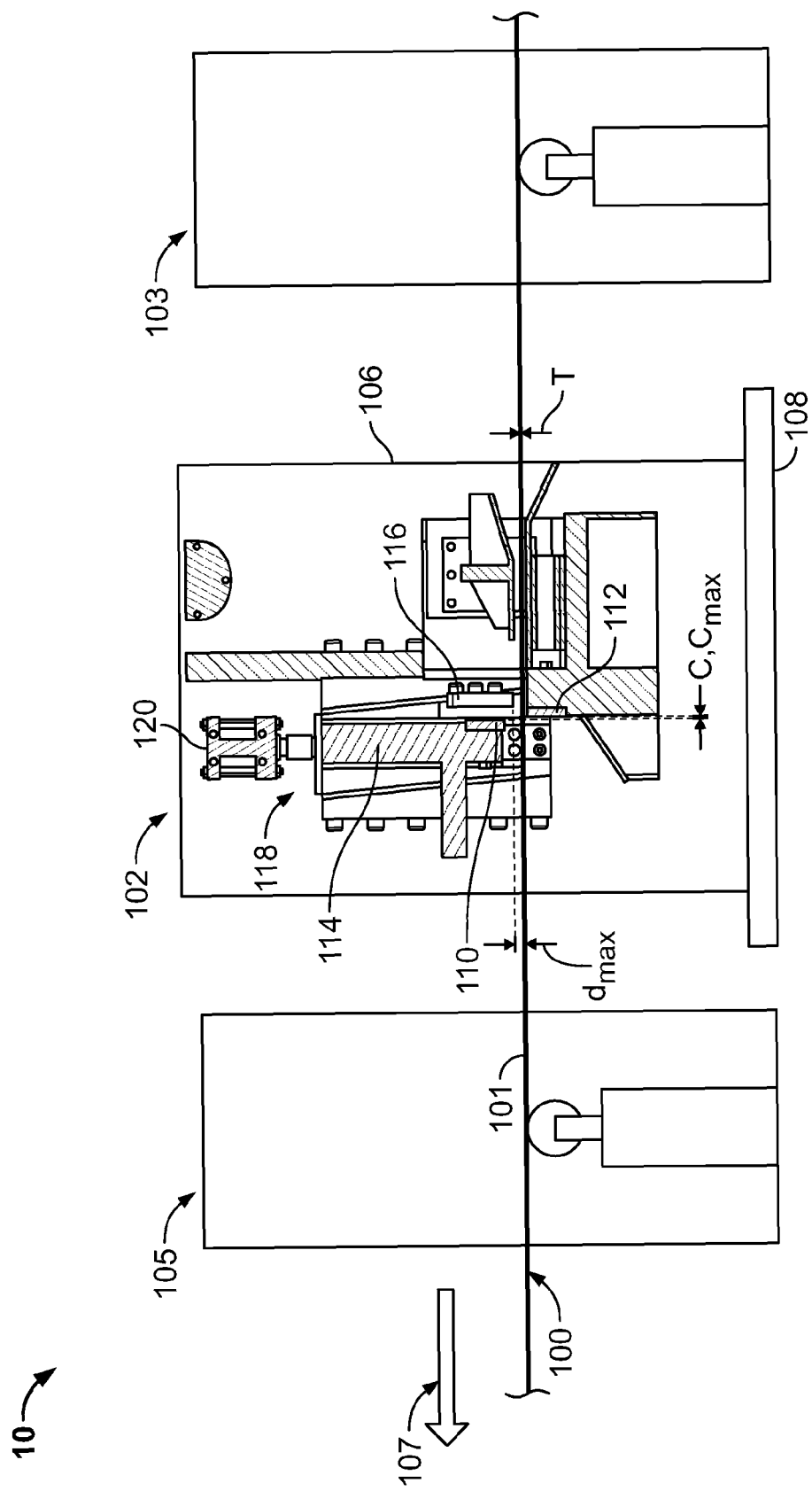
FIG. 1 is a side view of an example production system configured to process a strip material using an example shear press described herein.

In general, the example methods and apparatus described herein provide an automated adjustment of a lateral clearance or blade offset distance between an upper blade and a lower blade of a shear press (e.g., a horizontal distance or offset distance along the direction of travel of a strip material relative to the blades) based on the thickness of a strip material for each length of strip material to be sheared or cut, without the need for initial set up or adjustment. In particular, a lateral clearance adjustor can adjust a lateral blade offset from an initial lateral blade offset position to a lateral blade offset shearing position based on the thickness of the strip material detected by a hold down bar operatively coupled to the lateral clearance adjustor. At an initial adjustor position, the lateral clearance adjustor provides a maximum lateral clearance or a maximum lateral blade offset (e.g., a maximum horizontal distance or separation) between the upper and the lower blades and a maximum material clearance position (e.g., a maximum vertical distance or separation) between the hold down bar and a surface of the material moving through the shear press. The adjustor position of the lateral clearance adjustor changes to provide a lateral blade offset between the upper and the lower blades based on the position of the hold down bar relative to a surface of the material moving through the shear press.

To shear the strip material at a desired shearing length, a ram drives an upper blade toward a lower blade. As the ram drives the upper blade toward the lower blade, the hold down bar and lateral clearance adjustor move substantially in tandem with the ram. To determine or detect the lateral blade offset shearing position based on the thickness of the strip material, the hold down bar moves substantially perpendicular (e.g., substantially vertically) relative to the strip material to engage a surface of the strip material and continues to move perpendicular relative to the surface of the strip material while in engagement therewith as the thickness of the strip material progressively becomes thinner.

As the hold down bar engages the surface of the strip material, the position of the lateral clearance adjustor changes based on the location of the hold down bar to provide a lateral blade offset (e.g., an optimum lateral clearance) between the upper and lower blades of the shear press. To determine the lateral blade offset shearing position, the hold down bar engages a surface of the strip material and prevents the lateral clearance adjustor from moving beyond the clearance position detected by the hold down bar. The ram continues to move the upper blade toward the lower blade to shear the strip material with an optimum lateral blade offset between the upper and the lower blades.

The lateral clearance adjustor includes a tapered surface that slidably engages a tapered edge of a mounting plate and a groove or slot that slidably receives a ram, which supports the upper blade. In operation, the tapered surface slidably engages the tapered edge of the mounting plate to cause the ram and, thus, the upper blade to shift laterally (e.g., horizontally) relative to the lower blade to vary a lateral clearance or offset distance (e.g., an optimum lateral clearance) between the upper and the lower blades as the tapered surface slides along the tapered edge of the mounting plate. The angles of the tapered surface are formed to provide a predetermined gap ratio that is used to determine a proper lateral blade offset based on the thickness of the strip material (e.g., a lateral clearance-to-material thickness ratio value). An optimum and/or proper clearance or blade offset distance is determined for each length of strip to be cut by the shear press (i.e., for each cutting cycle).

FIG. 1A is a side view of an example production system 10 configured to process a strip material 100 using an example shear press 102 described herein. In some example implementations, the example production system 10 may be part of a manufacturing system, which may include a plurality of subsystems that modify or alter the strip material 100 using processes that, for example, punch, stack and/or fold the strip material 100. In alternative example implementations, the shear press 102 may be implemented as a standalone system, a hand fed system, etc. The material 100 may be a metallic strip material supplied on a roll or may be any other metallic or non-metallic material. Additionally, the shear press 102 may be configured to shear, cut, score, or otherwise partially cut or penetrate any material including, for example, steel, aluminum, other metallic materials, plastic, etc.

In the illustrated example, the example shear press 102 may be placed between a first operating unit 103 and a subsequent operating unit 105. The strip material 100 travels from the first operating unit 103, through the shear press 102, to the subsequent operating unit 105 in a direction generally indicated by arrow 107. The first operating unit 103 may be an uncoiler and the subsequent operating unit 105 may be a material delivery system such as, for example, a stacker, a conveyor, etc. Additionally, the first and second operating units 103 and 105 may be implemented to perform any desired type of process associated with a strip material manufacturing system or the like.

Figure 5A:
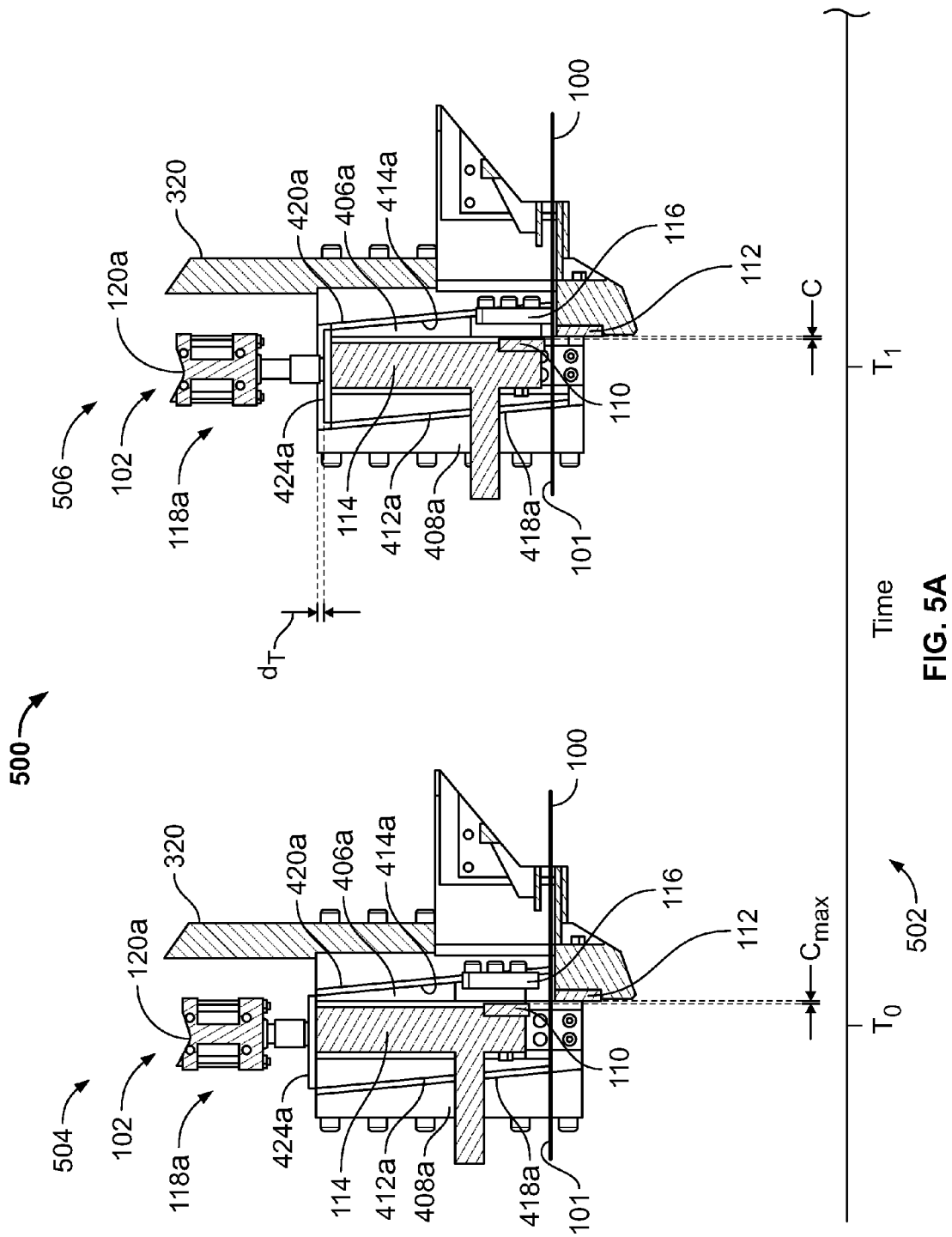
FIGS. 5A and 5B illustrate a time sequence diagram depicting the operation of the example shear press of FIGS. 1, 3A, 3B, 4A and 4B.
Figure 5B:
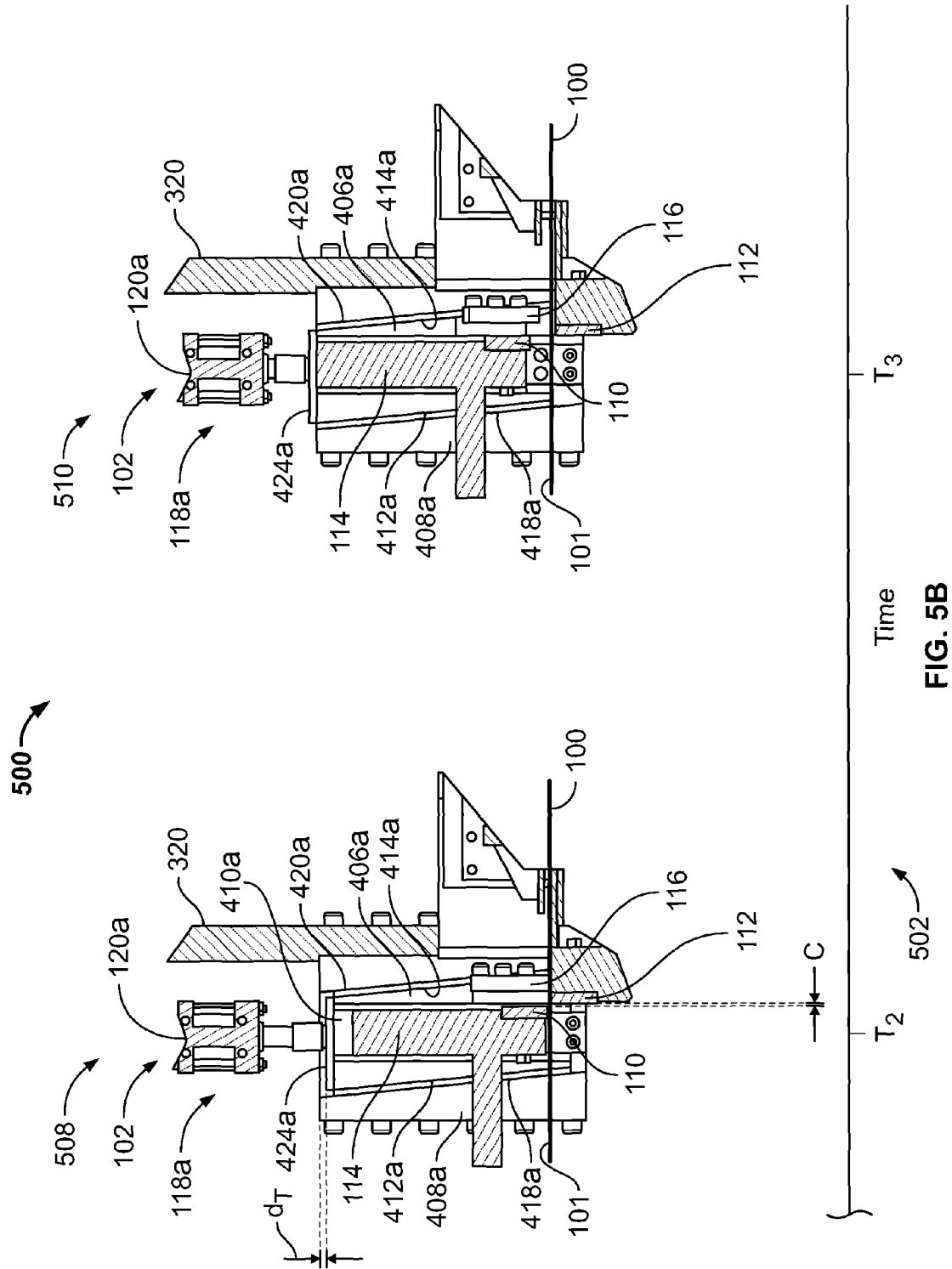

As shown by way of example in FIG. 1, the example shear press 102 includes a frame 106 mounted on a base 108. The shear press 102 includes an upper blade 110 opposite a lower blade 112. The upper blade 110 is coupled to a ram 114 that reciprocates or moves the upper blade 110 toward and away from the lower blade 112 to shear or cut the strip material 100. Additionally, the ram 114 is configured to provide sufficient structural strength to maintain its structural integrity while impacting (e.g., cutting) the material 100 as it moves through the shear press 102. A sensor 116 is operatively coupled to a lateral clearance adjustor 118 to detect a detector engagement position $d_T$ (FIGS. 5A and 5B). In the illustrated example, the sensor 116 is depicted as a hold down bar that engages a surface 101 of the strip material 100 to determine or sense the detector engagement position $d_T$ based on the thickness T of the strip material 100. Thus, the detector engagement position $d_T$ is a measure of the distance between a surface of the hold down bar 116 and a surface 101 of the material 100. However, in other example implementations, the sensor 116 can be any sensor such as, for example, an optical sensor, a magnetic sensor, or any other suitable sensor that can determine the detector engagement position $d_T$ based on the thickness of the strip material 100.

The lateral clearance adjustor 118 adjusts the lateral clearance or lateral blade offset C between the upper and lower blades 110 and 112 based on the thickness T of the strip material 100 to provide a proper and/or optimum lateral clearance between the upper and lower blades of the shear press 102. In the illustrated example, the lateral clearance C is the horizontal distance or offset distance along the direction of travel of the strip material 100 between the upper and lower blades 110 and 112 when the blades 110 and 112 contact the strip material 100. The lateral clearance adjustment is performed when the lateral clearance adjustor 118 moves from an initial position $d_{max}$ (e.g., which corresponds to a maximum lateral clearance $C_{max}$) to the detector engagement position $d_T$ (FIGS. 5A and 5B) corresponding to a position at which the hold down bar 116 contacts or engages the surface 101 of the strip material 100. Thus, the detector engagement position $d_T$ is based on the thickness T of the strip material 100 and increases as the thickness T of the strip material 100 decreases.

As shown in FIG. 1, at the initial position $d_{max}$, the hold down bar 116 is at a maximum distance relative to the surface 101 of the material 100, and the lateral clearance adjustor 118 provides a maximum lateral clearance $C_{max}$ between the upper and the lower blades 110 and 112. To detect a proper and/or optimum lateral clearance C based on the thickness T of the strip material 100, the hold down bar 116 engages the surface 101 of the strip material 100 and moves substantially perpendicular (e.g., substantially vertically) relative to the surface 101 of the strip material 100 towards the lower blade 112. As the hold down bar 116 engages the surface 101 of the strip material 100, the hold down bar 116 causes the lateral clearance adjustor 118 to also move to the detector engagement position $d_T$ (FIGS. 5A and 5B) detected by the hold down bar 116. In this manner, the proper and/or optimum lateral clearance C between the upper and the lower blades is set based on the thickness T of the strip material 100. Thus, as the lateral clearance adjustor 118 moves along a relatively greater distance for relatively thinner strip materials, the lateral clearance C between the upper and lower blades 110 and 112 decreases.

A biasing member 120 biases the hold down bar 116 against the strip material 100 to determine the detector engagement position $d_T$ and positions the lateral clearance adjustor 118 to the detector engagement position $d_T$. In operation, the ram 114 drives the upper blade 110 toward the lower blade 112 to shear the strip material 100 using the lateral clearance C between the upper and lower blades 110 and 112 when the strip material 100 has a thickness T.

In the illustrated example, the biasing member 120 is depicted as an air operated actuator. However, in other example implementations, the biasing member 120 can be a spring, a piston and spring, or any other suitable biasing element to bias the hold down bar 116 against the surface 101 of the strip material 100 and position the lateral clearance adjustor 118 to the detector engagement position $d_T$. In yet other example implementations, the actuator 120 can be a hydraulic actuator, an electric actuator, or any other suitable actuator.

FIGS. 2A, 2B and 2C illustrate the strip material 100 being cut or sheared by the upper and lower blades 110 and 112 using different lateral clearances or lateral blade offsets. In particular, FIG. 2A depicts a proper lateral clearance 202, FIG. 2B depicts a tight or insufficient lateral clearance 204, and FIG. 2C depicts an excessive lateral clearance 206. As depicted in FIG. 2A, the lateral clearance C is the horizontal distance or offset distance along the direction of travel of the strip material 100 between the upper and the lower blades 110 and 112 when each blade contacts the strip material 100. Setting a proper lateral clearance C for a strip material having a particular thickness T produces a smooth, straight cut.

Referring to FIG. 2B, setting a lateral clearance $C_t$ that is too close or tight (i.e., an insufficient lateral clearance) may cause the upper and lower blades 110 and 112 to pinch the strip material 100 and produce a rough, burred, and/or a misaligned cut (e.g., a non-square cut). In addition, setting the lateral clearance $C_t$ too close or tight can cause the blades 110 and 112 to impact, resulting in blade damage and/or excessive blade wear. Referring to FIG. 2C, setting a lateral clearance $C_l$ that is too far apart (i.e., an excessive lateral clearance) may cause the upper and lower blades 110 and 112 to tear the strip material 100, thereby producing a rough or jagged cut and/or causing the strip material 100 to fold between the upper and lower blades 110 and 112.

As mentioned above, a proper lateral clearance C is dependent on the thickness T of the strip material 100. As the thickness (i.e., the gauge) of the strip material 100 increases, the proper lateral clearance C between the upper and lower blades 110 and 112 also increases. Typically, a proper lateral clearance C is calculated or determined using a predetermined percentage ratio (i.e., a gap ratio) of the material thickness (e.g., the lateral clearance to material thickness ratio). In this manner, a proper lateral clearance C (i.e., the lateral or offset distance between the shear blades) can be determined using the gap ratio that produces a smooth, accurate cut for each strip material that has a thickness T. A predetermined gap ratio eliminates the need for initial set up that may be required by an operator to properly position measuring devices and/or mechanisms to determine or properly set a desired gap ratio.

In the example shear press 102 described herein, the lateral clearance adjustor 118 uses a desired predetermined gap ratio (i.e., a predetermined clearance C to material thickness ratio value) to determine and automatically set the proper and/or optimum lateral clearance C for each section of strip material to be sheared or cut based on the thickness of that section of strip material. Lateral clearance adjustors that provide different desired predetermined gap ratios can be used in the example shear press 102 described herein. For example, a lateral clearance adjustor that has a predetermined gap ratio of eight percent (8%) (i.e., provides a lateral clearance C that is 8% of the thickness of the strip material 100) can be replaced with a lateral clearance adjustor that has a predetermined gap ratio of ten percent (10%) (i.e., provides a lateral clearance C that is 10% of the thickness of the strip material 100).

Figure 3A:
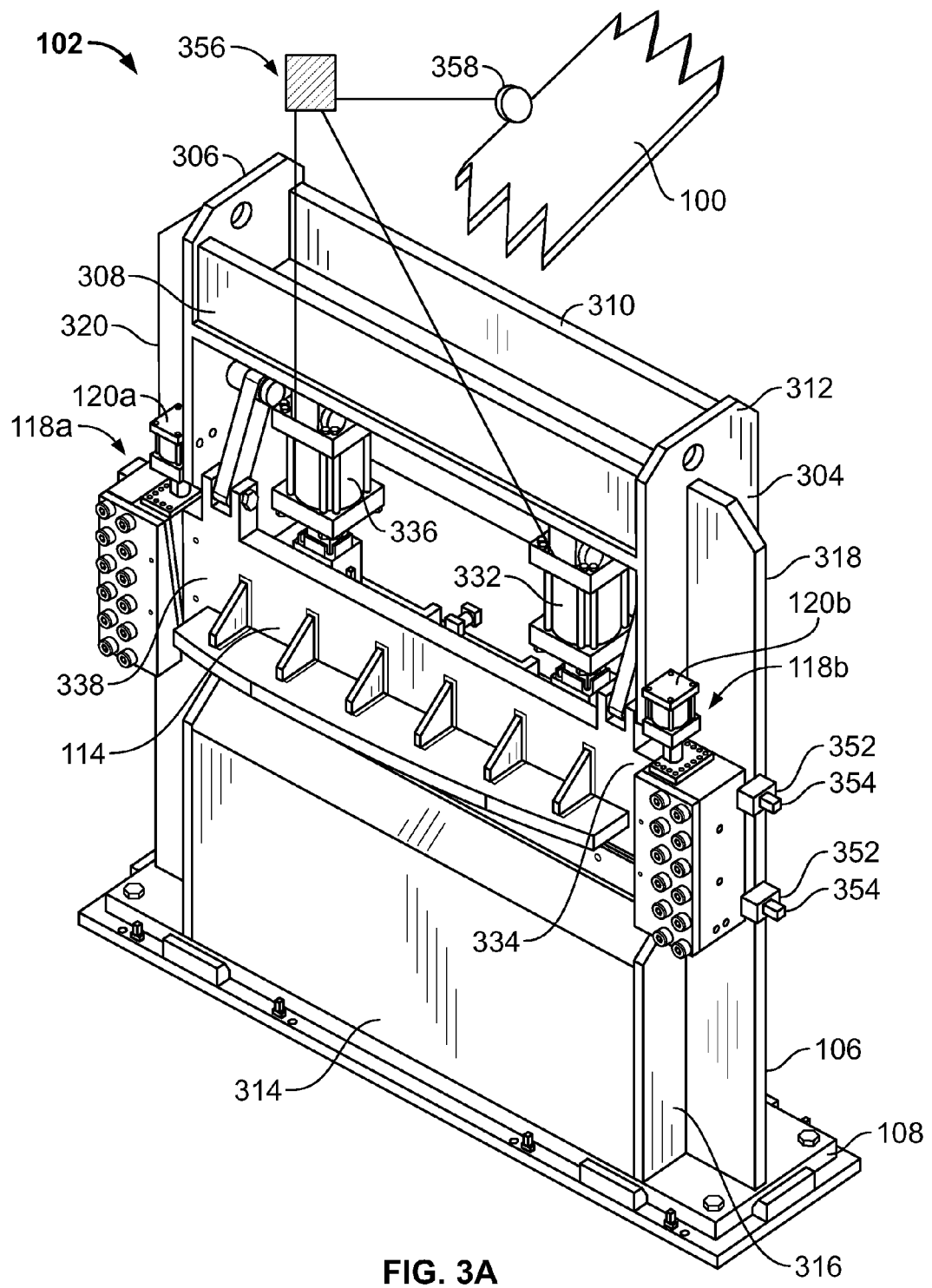
FIG. 3A is a perspective view of the example shear press of FIG. 1.
Figure 3B:
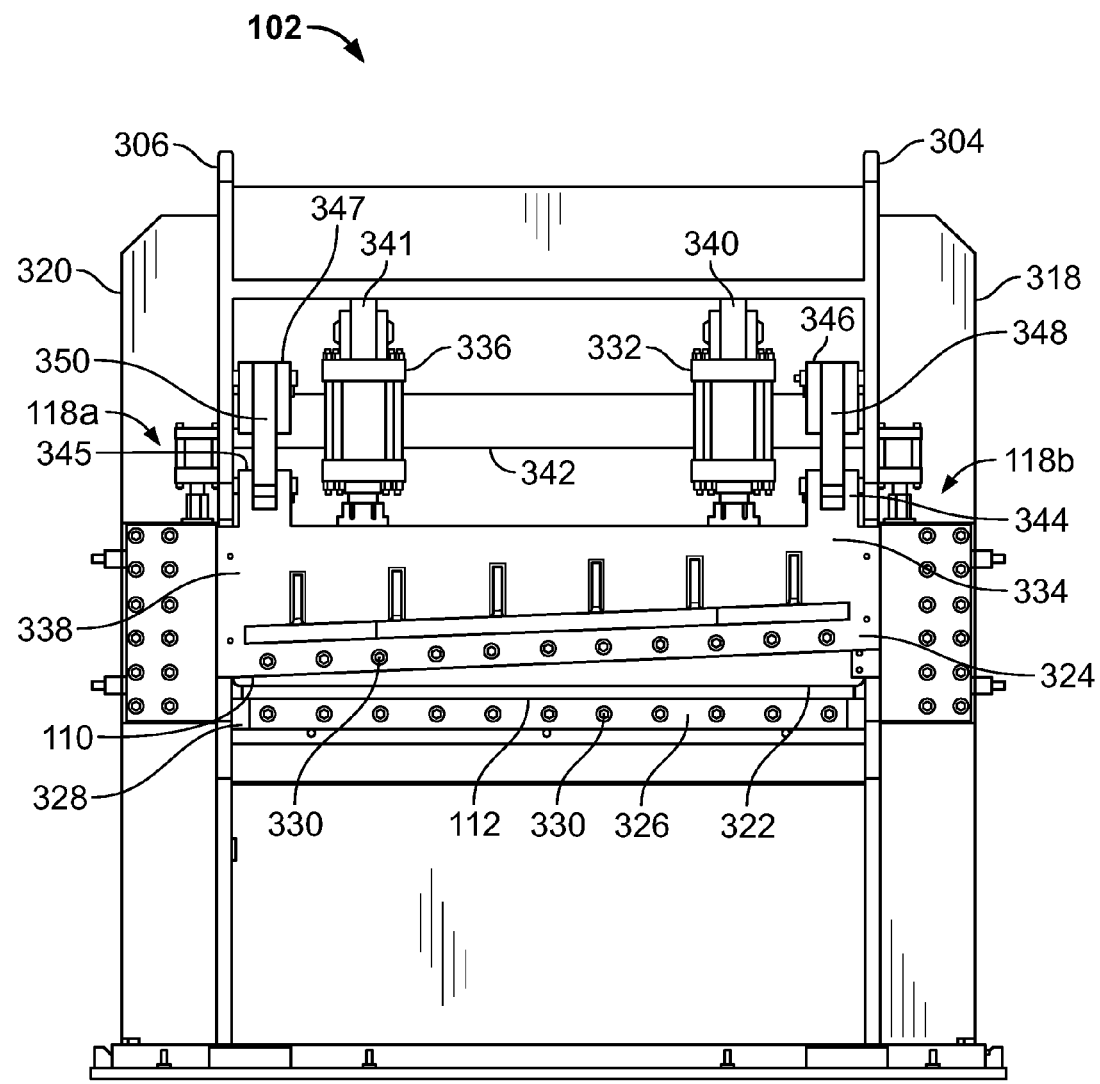
FIG. 3B is a front view of the example shear press of FIG. 1.

FIG. 3A is a perspective view and FIG. 3B is a front view of the example shear press 102 described in FIG. 1. Referring to FIGS. 3A and 3B, the frame 106 is supported by the base 108 and includes a first side member 304 spaced from a second side member 306. The first and second side members 304 and 306 are coupled by upper support members 308 and 310 at an upper end 312 of the frame 106 and a body or housing 314 at a lower end 316 of the frame 106. The side members 304 and 306 also include side mounting members 318 and 320 that are substantially perpendicular to the side members 304 and 306, extend along the length of the side members 304 and 306 and have a width sufficient for mounting lateral clearance adjustors 118a and 118b thereon.

The upper and the lower blades 110 and 112 (FIG. 3B) extend between the first and second side members 304 and 306 of the frame 106. As shown in FIG. 3B, the upper blade 110 is angled (i.e., has a rake angle) to provide an offset shearing action so that the strip material 100 is progressively sheared from one side of the strip material 100 to the other side to provide a straight, smooth cut. In some example implementations, the rake angle can be adjustable. A blade holder 322 couples the upper blade 110 to a lower front edge 324 of the ram 114 and a blade holder 326 couples the lower blade 112 to a support beam 328 that is integrated with the housing 314 and the frame 106 (FIG. 3A). As most clearly shown in FIG. 3B, both the upper and lower blades 110 and 112 are coupled to the blade holders 322 and 326 via a plurality of fasteners 330. However, in other example implementations, the blades 110 and 112 can be coupled to the blade holders 322 and 326 via clamps, clips, etc. or any other suitable fastening mechanism(s).

To drive the ram 114 and the upper blade 110 (FIG. 3B), the shear press 102 employs a first actuator 332 operatively coupled to a first side 334 (e.g., the right side) of the ram 114 and a second actuator 336 operatively coupled to a second side 338 (e.g., the left side) of the ram 114 and mounted to the frame 106 at ends 340 and 341 of the actuators 332 and 336, respectively. The actuators 332 and 336 substantially simultaneously drive the first and second sides 334 and 338 of the ram 114 to lower and raise the upper blade 110 toward and away from the lower blade 112 to cut or shear the strip material 100. The actuators 332 and 336 are illustrated as hydraulic actuators. However, in other example implementations, the actuators 332 and 336 can be pneumatic actuators or any other suitable types of actuators or motors. In yet other example implementations, the ram 114 can be driven by a single actuator or motor.

The first and second sides 334 and 338 of the ram 114 are pivotally coupled to a shaft 342. The ram 114 includes mounting brackets 344 and 345 and the shaft 342 includes brackets 346 and 347. The ram 114 couples to the shaft 342 via links 348 and 350. The shaft 342 is rotatably coupled to the side members 304 and 306 of the frame 106. In the illustrated example, the lateral clearance adjustors 118a and 118b are mounted on each of the side mounting members 318 and 320 of the frame 106 and engage the respective first and second sides 334 and 338 of the ram 114 to guide the ram 114 in a substantially vertical path during the cutting cycle of the shear press 102. As shown in FIG. 3A, the lateral clearance adjustors 118a and 118b are operatively coupled to the side mounting members 318 and 320 of the frame 106 via a plurality of brackets 352 and fasteners 354. Actuators 120a and 120b are operatively coupled to the respective lateral clearance adjustors 118a and 118b.

To actuate the ram actuators 332 and 336 and, thus, to drive the ram 114 and the upper blade 110 of the shear press 102, the shear press 102 is provided with a controller 356, which can be implemented using an example processor system 710 discussed below in connection with FIG. 7. In addition, the shear press 102 is provided with an encoder 358 to monitor the speed and/or length of the material 100 passing through the shear press 102. The encoder 358 may be implemented using, for example, an optical encoder, a magnetic encoder, etc. In other example implementations, other sensor devices may be used instead of an encoder to monitor the speed and/or length of the material 100.

Figure 4A:
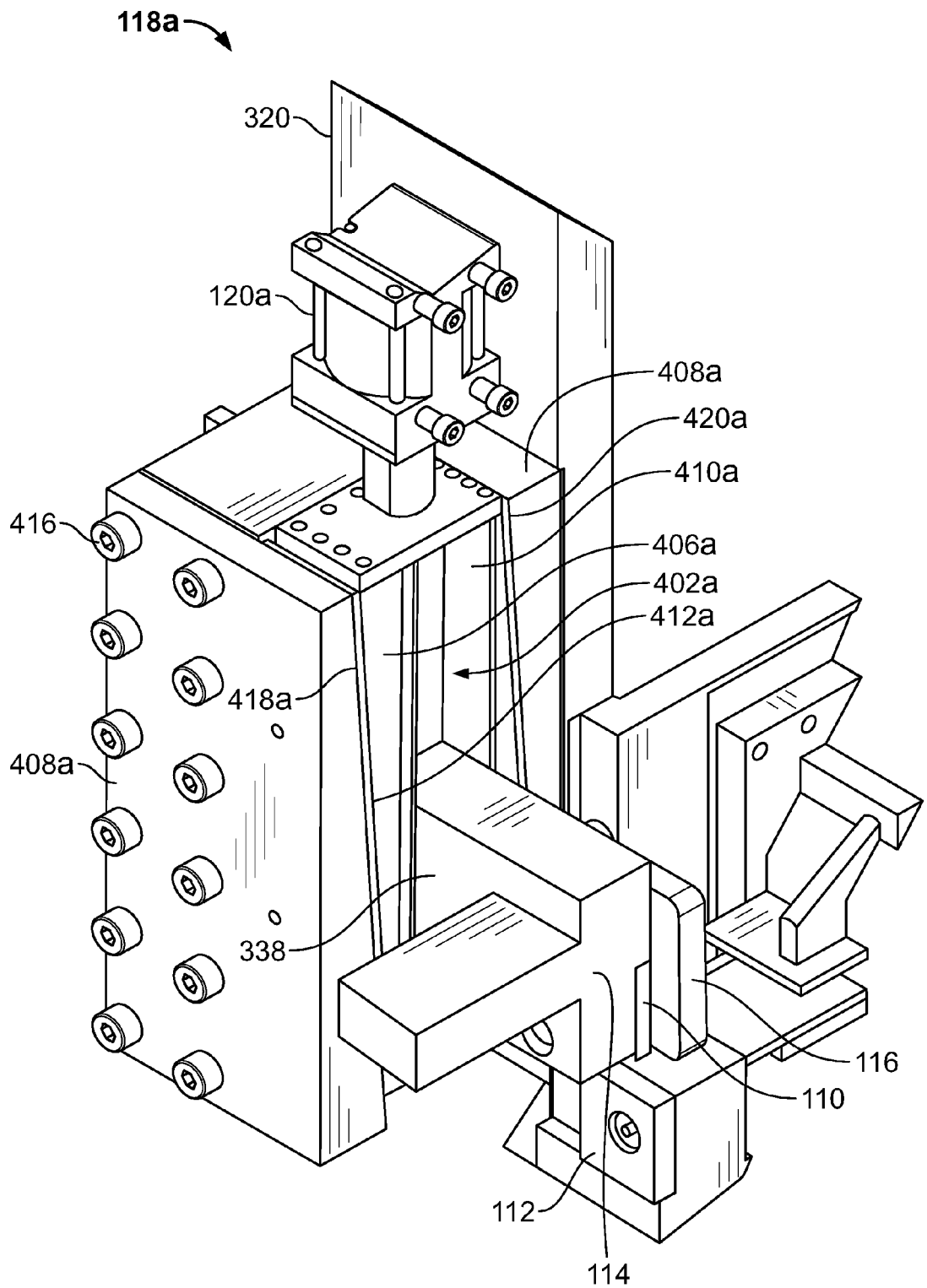
FIG. 4A is a partially enlarged front perspective view of the example shear press of FIGS. 1, 3A and 3B.
Figure 4B:
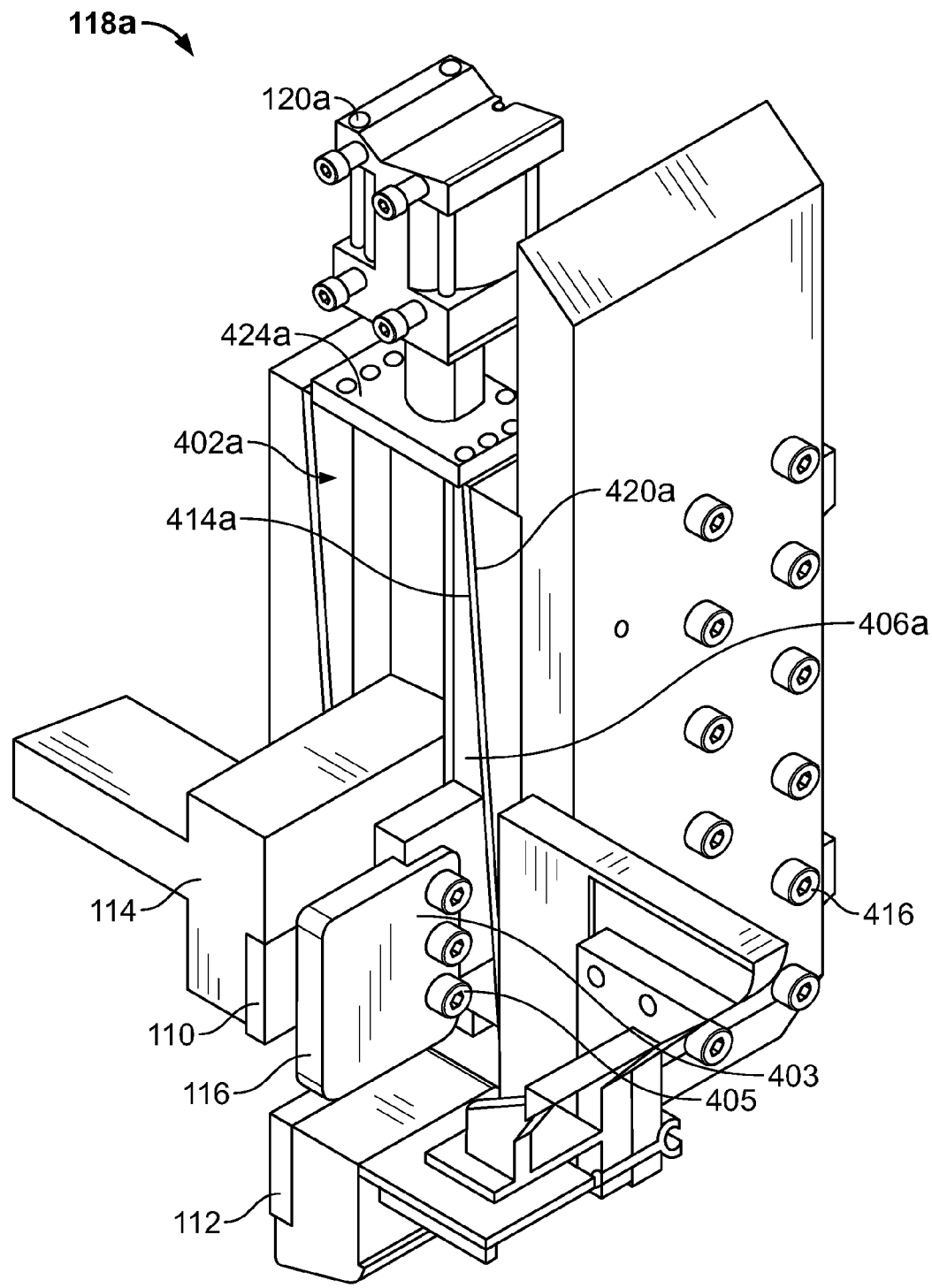
FIG. 4B is a partially enlarged rear perspective view of the example shear press of FIGS. 3A and 3B.

FIGS. 4A and 4B depict partially enlarged front and rear perspective views of the lateral clearance adjustor 118a of FIGS. 3A and 3B. Although not shown in FIGS. 4A and 4B, the lateral clearance adjustor 118b of FIGS. 3A and 3B includes components that are substantially similar to the components of the lateral clearance adjustor 118a and, thus, the description and functions of those components of the lateral clearance adjustor 118b will not be repeated. The respective components of the lateral clearance adjustors 118a and 118b work cooperatively to enable operation of the shear press 102 according to the example methods and apparatus described herein.

Referring in detail to FIGS. 4A and 4B, the lateral clearance adjustor 118a includes a slide device 402a operatively coupled to the hold down bar 116 that detects or determines the detector engagement position $d_T$. In addition to determining the detector engagement position $d_T$, the hold down bar 116 secures the strip material 100 in place to maintain proper positioning of the strip material 100 during shearing or cutting. The hold down bar 116 is operatively coupled to the slide device 402a at a first end 403 via fasteners 405 and is positioned adjacent to the ram 114. Although not shown, the hold down bar 116 extends from the lateral clearance adjustor 118a and couples to a slide device (not shown but substantially similar to the slide device 402a) of the lateral clearance adjustor 118b (FIGS. 3A and 3B) at a second end (not shown) of the hold down bar 116.

The slide device 402a includes an adjustable gib or wedge 406a that slidably couples to a fixed gib or gib mounting plate 408a. The adjustable gib 406a includes a groove or track 410a to slidably receive the ram 114 between a first tapered surface 412a (FIG. 4A) and a second tapered surface 414a (FIG. 4B). In the illustrated example, the adjustable gib 406a of the lateral clearance adjustor 118a slidably receives the second end 338 of the ram 114 (FIGS. 3A and 3B) and an adjustable gib (not shown but substantially similar to the adjustable gib 406a) of the lateral clearance adjustor 118b (FIGS. 3A and 3B) slidably receives the first end 334 of the ram 114. The fixed gib or gib mounting plate 408a is coupled to the side mounting member 320 of the frame 106 via a plurality of fasteners 416.

The fixed mounting plate or gib mounting plate 408a also includes a first tapered edge 418a having an angle that is substantially similar or corresponding to an angle of the first tapered surface 412a of the adjustable gib 406a so that the first tapered edge 418a matably engages with the first tapered surface 412a, and a second tapered edge 420a having an angle that is substantially similar or corresponding to an angle of the second tapered surface 414a of the adjustable gib 406a so that the first tapered edge 420a matably engages with the first tapered surface 414a. In other words, the first tapered surface 412a of the adjustable gib 406a is substantially parallel to the first tapered edge 418a of the gib mounting plate 408a when in contact, and the second tapered surface 414a of the adjustable gib 406a is substantially parallel to the second tapered edge 420a of the gip mounting plate 408a when in contact.

In the illustrated example, the angle of the tapered surfaces 412a and 414a of the adjustable gib 406a and the angle of the tapered edges 418a and 420a of the gib mounting plate 408a provide the desired predetermined gap ratio (discussed above) to determine or set the proper and/or optimum lateral clearance based on the thickness of each section of strip material being processed. An adjustable gib and a gib mounting plate having differently angled tapered surfaces and edges can be used with the shear press 102 to provide a different desired predetermined gap ratio.

To adjust the lateral clearance C between the upper and lower blades 110 and 112, the first tapered surface 412a and the second tapered surface 414a of the adjustable gib 406a slidably engage the respective first and second tapered edges 418a and 420a of the gib mounting plate 408a. This engagement of the respective tapered surfaces 412a, 414a, 418a and 420a causes the ram 114 and, thus, the upper blade 110 to move laterally (e.g., horizontally) relative to the lower blade 112 when the adjustable gib 406a is moved vertically to the detector engagement position $d_T$ (FIGS. 5A and 5B) via the actuator 120a (FIGS. 3A and 3B). In the illustrated example of FIGS. 4A and 4B, the actuator 120a biases or urges the hold down bar 116 against the surface 101 of the strip material 100 to determine or sense the detector engagement position $d_T$ and positions the adjustable gib 406a to the detector engagement position $d_T$.

To bias the hold down bar 116 against the strip material 100 and position the adjustable gib 406a to the detector engagement position $d_T$, the actuator 120a directly engages a top plate 424a and applies pressure to the top plate 424a through a complete cutting stroke of the shear press 102. However, in other example implementations, the actuator 120a can be controlled with, for example, the controller 356 of FIG. 3A to operate simultaneously with the ram actuators 332 and 336 during the downward stroke of the shear press 102. In addition, the top plate 424a operatively couples the adjustable gib 406a to the ram 114. In this manner, when the ram actuators 332 and 336 retract the ram 114 to the initial position after the strip material 100 has been cut, the ram 114 engages the top plate 424a to return the adjustable gib 406a and hold down bar 116 to the initial position (i.e., the position in which the lateral clearance $C_{max}$ is at a maximum lateral or offset distance).

FIGS. 5A and 5B illustrate an example time sequence diagram 500 depicting an operation of the example shear press 102 of FIGS. 1, 3A, 3B, 4A and 4B. In particular, the example time sequence diagram 500 shows the time-varying relationship between the gib actuator 120a, the hold down bar 116, the adjustable gib 406a, the ram 114, and the upper blade 110 during operation of the shear press 102 (e.g., a complete cutting cycle of the shear press 102). In particular, the example time sequence diagram 500 depicts a complete cutting or shearing cycle of the example shear press 102 described herein.

Although FIGS. 5A and 5B depict only one side 320 (FIGS. 3A and 3B) of the shear press 102 illustrating the lateral clearance adjustor 118a and its respective components, the lateral clearance adjustor 118b and its respective components are also mounted on the side mounting member 318. The clearance adjustors 118a and 118b guide each of the ends 334 and 338 of the ram 114 and the respective components of the lateral clearance adjustors 118a and 118b work cooperatively to enable operation of the shear press 102 according to the example operational sequence shown in FIGS. 5A and 5B.

As shown in FIGS. 5A and 5B, the example time sequence diagram 500 includes a time line 502 and shows the shear press 102 at several cycle positions during the operation of the shear press 102. More specifically, the shear press 102 is shown in a sequence of shear press cycle positions corresponding to a $T_0$ cycle position 504, a $T_1$ cycle position 506, a $T_2$ cycle position 508, and a $T_3$ cycle position 510.

Now turning in detail to the operation of the shear press 102, the shear press 102 initially receives the strip material 100. The $T_0$ cycle position 504 shows the hold down bar 116, the adjustable gib 406a, the ram 114, and the upper blade 110 of the shear press 102 at an initial position $d_{max}$. At the initial $T_0$ cycle position 504, the lateral clearance C between the upper blade 110 and the lower blade 112 is at a maximum lateral clearance $C_{max}$. Also, in the illustrated example, the gib actuator 120a applies pressure to the top plate 424a to exert a bias force against the hold down bar 116 toward the surface 101 of the strip material 100. Although at the initial $T_0$ cycle position 504 the gib actuator 120a engages the top plate 424a and applies pressure to bias the hold down bar 116 against the surface 101 of the strip material 100, the hold down bar 116 and the adjustable gib 406a remain in the initial position $d_{max}$ until the controller 356 (FIG. 3A) actuates the ram actuators 332 and 336 (FIGS. 3A and 3B). In this manner, the gib actuator 120a does not produce enough force to move or drive the ram 114. In other example implementations, the gib actuator 120a can be controlled by the controller 356 to operate synchronously with the ram actuators 332 and 336 and/or retract to the initial position $d_{max}$ when the strip material 100 has been cut or sheared.

During the $T_1$ cycle position 506, the ram actuators 332 and 334 drive the ram member 114 and the upper blade 110 towards the lower blade 112 to shear the strip material 100. When the ram actuators 332 and 336 actuate the ram 114, the force applied by the gib actuator 120a exerts a bias force against the hold down bar 116 to urge the hold down bar 116 against the surface 101 of the strip material 100 to determine the strip detector engagement position $d_T$ and positions the adjustable gib 406a to the detector engagement position $d_T$. Thus, the hold down bar 116 and the adjustable gib 406a follow and/or move in tandem with the ram 114 until the hold down bar 116 engages the surface 101 of the strip material 100. As the adjustable gib 406a follows the ram 114, the tapered surfaces 412a and 414a of the adjustable gib 406a slidably engage the respective tapered edges 418a and 420a of the gib mounting plate 408a to shift the upper blade 110 substantially vertically and horizontally relative to the lower blade 112 until the hold down bar 116 engages the surface 101 of the strip material 100. When the hold down bar 116 engages the surface 101 of the strip material 100, the hold down bar 116 also prevents the adjustable gib 406a from moving beyond the detector engagement position $d_T$. In this manner, the proper and/or optimum lateral clearance C between the blades 110 and 112 is set based on the predetermined gap ratio and the thickness T of the strip material 100 (e.g., the lateral clearance C is determined based on a predetermined percentage of the material thickness).

Referring to the $T_2$ cycle position 508, the $T_2$ cycle position 508 shows the ram 114 and the upper blade 110 continuing to travel toward the cutting or shearing position when the adjustable gib 406a is positioned to the detector engagement position $d_T$. The groove or track 410a of the adjustable gibs 406a guides the ram 114 in a substantially vertical path towards the fixed lower blade 112 to shear and cut the strip material 100.

The $T_3$ cycle position 510 illustrates the ram 114 and the upper blade 110 as they travel away from the cutting or shearing position after the strip material 100 has been cut or sheared. After the strip material 100 is cut, the ram 114 and the upper blade 110 return to the initial cycle position $d_{max}$ (the $T_0$ cycle position 502) via the ram actuators 332 and 336 to complete the shearing or cutting cycle (i.e., one complete cutting stroke). As the ram 114 and the upper blade 110 return to the initial position $d_{max}$, the ram 114 engages the top plate 424a to return the hold down bar 116 and the adjustable gib 406a to the position as shown in the $T_0$ cycle position (i.e., the initial position). The lateral clearance position C is determined for each length of strip material to be cut by the shear press (i.e., for each cutting cycle).

Figure 6:
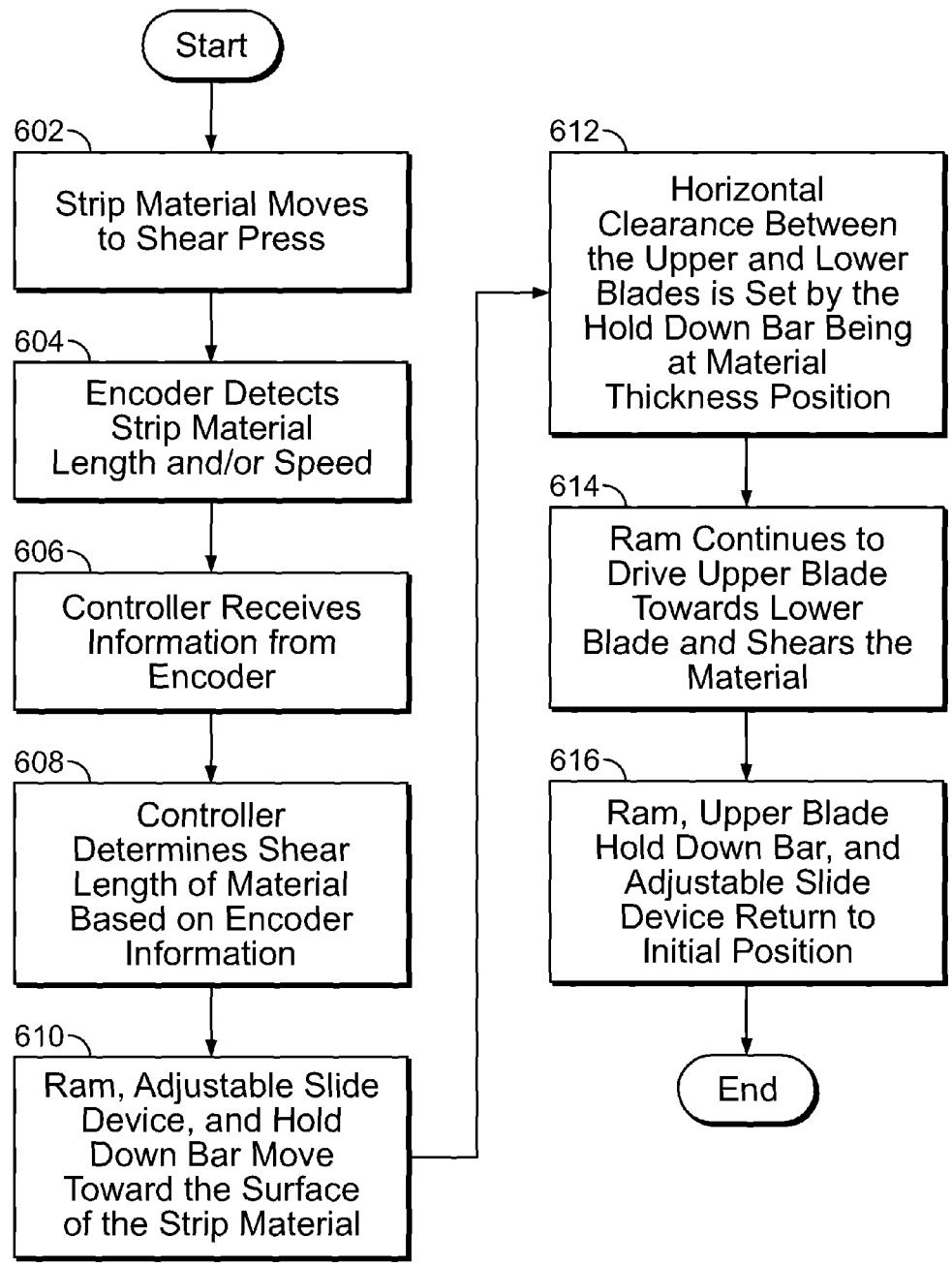
FIG. 6 is a flow diagram of an example method that may be used to control the example shear press of FIGS. 1, 3A, 3B, 4A and 4B.

FIG. 6 is a flow diagram of an example method that may be used to implement the shear press 102 of FIG. 1. In some example implementations, the example method of FIG. 6 may be implemented using machine readable instructions comprising a program for execution by a processor (e.g., a processor 712 shown in the example system 710 of FIG. 7) such as, for example, a processor of the controller 356 (FIG. 3A). The program may be embodied in software stored on a tangible machine readable medium such as a CD-ROM, a floppy disk, a hard drive, a digital versatile disk (DVD), a solid state memory (e.g., a flash memory, a read only memory (ROM), etc.) or a memory associated with the processor 712 and/or embodied in firmware and/or dedicated hardware in a well-known manner. Further, although the example method is described with reference to the flow diagram illustrated in FIG. 6, other methods of implementing the example shear press 102 may be used instead. For example, the order of execution of the blocks may be changed, and/or some of the blocks described may be changed, eliminated, or combined.

Turning in detail to FIG. 6, as the strip material 100 moves to the shear press 102 (block 602), the encoder 358 (FIG. 3A) detects the length and/or speed of the strip material 100 (block 604). The controller 356 then receives length and/or speed information from the encoder 358 (block 606) and determines the length of material to cut based on the length and/or speed information received by the encoder 358 (block 608). To shear the strip material 100 at the desired shearing length, the controller 356 causes the ram actuators 332 and 336 to drive the ram 114 and the upper blade 110 toward the surface 101 of the strip material 100 (block 610). For example, as shown in FIGS. 5A and 5B, the controller 356 causes the ram actuators 332 and 336 to drive the ram 114 from a position shown in the $T_0$ cycle position 504 to a cutting position shown in the $T_2$ cycle position 508.

As the ram 114 moves toward the surface 101 of the strip material 100, the gib actuator 120a (FIGS. 3A and 3B) applies pressure to the top plate 424a to move the hold down bar 116 and the adjustable gib 406a toward the surface 101 of the strip material 100 (block 610). The hold down bar 116 engages the surface 101 of the strip material 100 to determine the detector engagement position $d_T$ (block 612). The adjustable gib 406a moves from the initial position $d_{max}$ (i.e., the maximum lateral clearance $C_{max}$) shown in the $T_0$ cycle position 504 to the detector engagement position $d_T$ detected by the hold down bar 116 shown in the $T_1$ cycle position 506 (block 612). As shown in the $T_1$ cycle position 506, the hold down bar 116 engages the surface 101 of the strip material 100 and prevents the adjustable gib 406a from moving beyond the detector engagement position $d_T$ (block 612). The tapered surfaces 412a and 414a of the adjustable gib 406a slidably engage the respective tapered edges 418a and 420a of the gib plate 408a to cause the upper blade 110 to move substantially vertically and horizontally relative to the lower blade 112 to set the proper and/or optimum lateral clearance C between the upper blade 110 and the lower blade 112 based on a predetermined gap ratio and the material thickness T (block 612).

The ram 114 is guided within the groove 410a of the adjustable gib 406a and continues to move toward the lower blade 112 until the upper blade 110 and the lower blade 112 shear the strip material 100 (block 614) as shown in the $T_2$ cycle position 508. After the shear press 102 shears or cuts the material 100, the controller 356 causes the ram 114 to retract to the position shown in the $T_3$ cycle position 510. As the ram 114 returns to the $T_3$ cycle position 510, the ram 114 engages the top plate 424a to return the upper blade 110, the adjustable gib 406a, and the hold down bar 116 to the position shown in the $T_3$ cycle position 510, thereby completing a cutting stroke cycle (block 616). The lateral clearance position is determined for each length of strip material 100 to be processed by the shear press 102.

Figure 7:
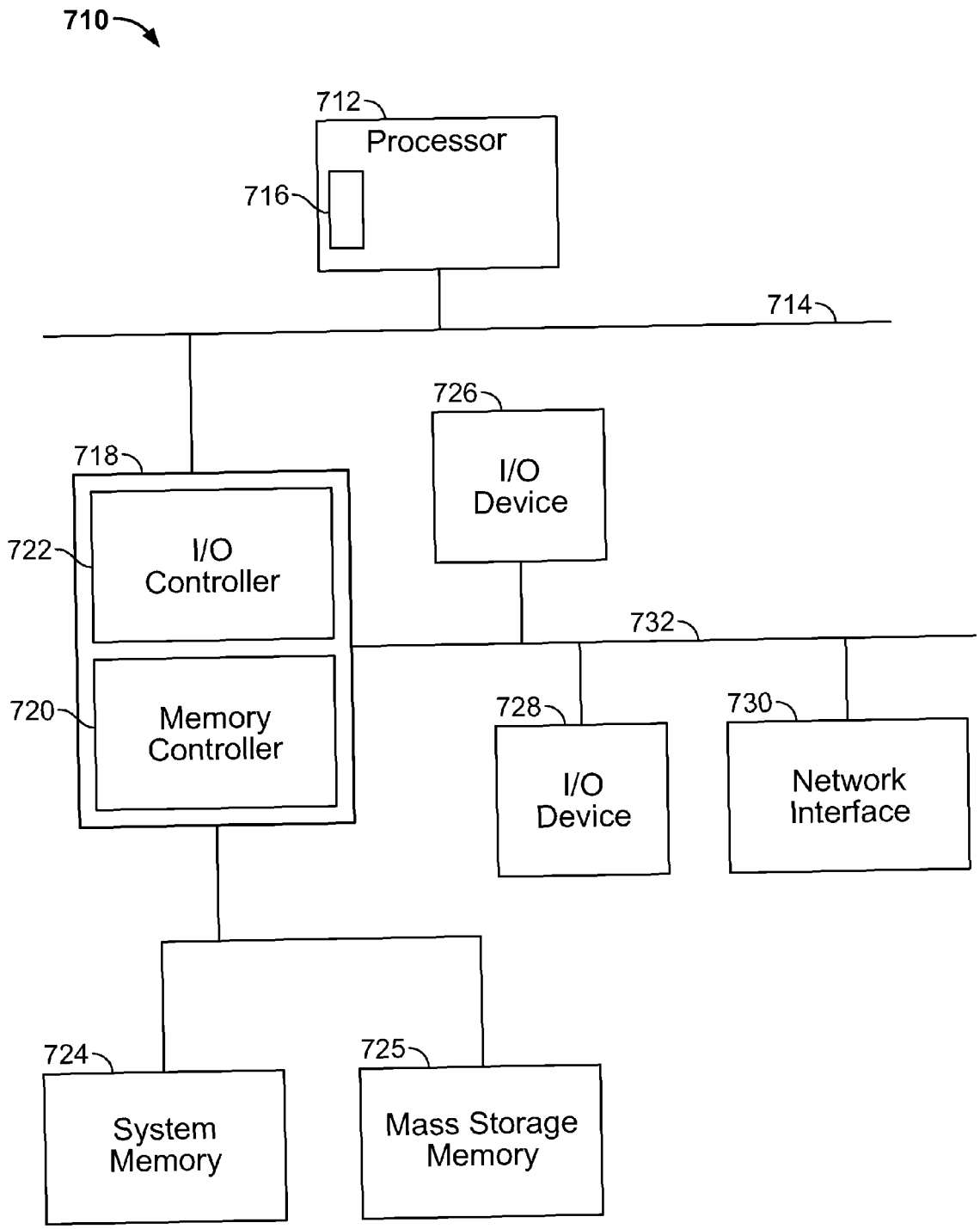
FIG. 7 is a block diagram of an example processor system that may be used to implement the example methods and systems described herein.

FIG. 7 is a block diagram of an example processor system 710 that may be used to implement the methods and systems described herein. As shown in FIG. 7, the processor system 710 includes a processor 712 that is coupled to an interconnection bus 714. The processor 712 includes a register set or register space 716, which is depicted in FIG. 7 as being entirely on-chip, but which could alternatively be located entirely or partially off-chip and directly coupled to the processor 712 via dedicated electrical connections and/or via the interconnection bus 714. The processor 712 may be any suitable processor, processing unit or microprocessor. Although not shown in FIG. 7, the system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and an input/output (I/O) controller 722. As is well known, a chipset typically provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724 and a mass storage memory 725.

The system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc.

The I/O controller 722 performs functions that enable the processor 712 to communicate with peripheral input/output (I/O) devices 726 and 728 and a network interface 730 via an I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode (ATM) device, an 802.11 device, a DSL modem, a cable modem, a cellular modem, etc. that enables the processor system 710 to communicate with another processor system.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A shear press comprising:
a first blade opposite a second blade and movably coupled to a frame of the shear press via a ram, wherein the first and second blades are to receive a strip material;
a first lateral clearance adjustor slidably coupled to a first end of the ram and a second lateral clearance adjustor slidably coupled to a second end of the ram, the first and second lateral clearance adjustors to shift the first blade laterally relative to the second blade, the first lateral clearance adjustor having a first adjustable gib slidably coupled to a first gib plate, the first adjustable gib having a first wedge that includes a first tapered surface and a first groove to slidably receive the first end of the ram, and the second lateral clearance adjustor having a second adjustable gib slidably coupled to a second gib plate, the second adjustable gib having a second wedge that includes a second tapered surface and a second groove to slidably receive the second end of the ram;
a sensor to determine a clearance position;
a first drive member to move the first and second lateral clearance adjustors from an initial position to the clearance position, the first drive member to exert a biasing force against the sensor to urge the sensor toward a surface of the strip material; and
a second drive member operatively coupled to the ram to drive the first blade toward the second blade to shear the strip material.

2. A shear press as defined in claim 1, further comprising a first blade holder to couple the first blade to the ram and a second blade holder to couple the second blade to the frame.

3. A shear press as defined in claim 1, wherein the sensor comprises a hold down bar operatively coupled to the first and second lateral clearance adjustors.

4. A shear press as defined in claim 3, wherein the first drive member exerts a bias force against the hold down bar to urge the hold down bar against a surface of the strip material to determine the clearance position.

5. A shear press as defined in claim 1, wherein the first gib plate is coupled to a first side of the frame and has a tapered edge to engage the tapered surface of the first adjustable gib, and wherein engagement of the tapered surface of the first adjustable gib and the tapered edge of the first gib plate causes the first blade to move laterally relative to the second blade.

6. A shear press as defined in claim 5, wherein an angle of the tapered surface and an angle of the tapered edge provide a predetermined gap ratio that determines a different lateral clearance for each length of strip material having a different thickness.

7. A shear press as defined in claim 5, wherein the second gib plate is coupled to a second side of the frame and has a tapered edge to engage the tapered surface of the second adjustable gib, and wherein engagement of the tapered surface of the second adjustable gib and the tapered edge of the second gib plate causes the first blade to move laterally relative to the second blade.

8. A shear press as defined in claim 1, wherein the initial position provides a relative maximum lateral clearance between the first blade and the second blade and a maximum material clearance between the sensor and a surface of the material.

9. A shear press as defined in claim 1, wherein the clearance position provides an optimum lateral clearance between the first blade and the second blade and a material clearance in which the sensor substantially engages a surface of the material.

10. A shear press as defined in claim 1, wherein the sensor is to detect the lateral clearance position for each stroke of the shear press.

11. A shear press as defined in claim 1, wherein the first and second lateral clearance adjustors are to return to the initial position after the strip material has been cut.

12. A shear press as defined in clam 1, further comprising a controller operatively coupled to the second drive member to drive the ram toward the lower blade to cut the strip material at a shear length.

13. A shear press defined in claim 12, further comprising an encoder to determine the shear length.

14. A shear press as defined in claim 1, wherein the second drive member is to move the ram along a path substantially parallel relative to a first longitudinal axis of the first drive member.

15. A shear press as defined in claim 1, wherein the first and second lateral clearance adjustors move along a path substantially parallel relative to a longitudinal axis of the first drive member.

\* \* \* \* \*